United States Patent [19]

Hoff

[11] 3,777,126

[45] Dec. 4, 1973

[54] MEASUREMENT TRANSDUCER CALCULATOR INTERFACE

[75] Inventor: Donald G. Hoff, Tiburon, Calif.

[73] Assignee: Dietzgen Electronics, Inc., South San Francisco, Calif.

[22] Filed: May 3, 1972

[21] Appl. No.: 249,936

Related U.S. Application Data

[63] Continuation-in-part of Ser. No. 815,981, April 14, 1969.

[52] U.S. Cl. ................ 235/151.3, 235/156, 235/92, 340/172.5

[51] Int. Cl. ....... G06f 7/38, G06f 15/02, G06f 3/05

[58] Field of Search ................ 235/151.3, 156, 159, 235/92; 33/122, 123, 1; 340/172.5

[56] References Cited

UNITED STATES PATENTS

| | | | |
|---|---|---|---|
| 3,509,329 | 4/1970 | Wang et al. | 235/159 X |
| 3,246,128 | 4/1966 | Albrecht et al. | 235/92 |
| 3,393,299 | 7/1968 | Baker | 235/92 |
| 3,132,262 | 5/1964 | Kaufmann | 307/88.5 |
| 3,582,906 | 6/1971 | Beausoleil et al. | 340/172.5 |
| 3,623,010 | 11/1971 | Burkhalter | 340/172.5 |

*Primary Examiner*—Felix D. Gruber
*Assistant Examiner*—Edward J. Wise
*Attorney*—Stephen S. Townsend et al.

[57] ABSTRACT

A measurement transducer/calculator interface for processing output signals from one or more measurement transducers for input to an electronic calculator. The interface is coupled for receiving and shaping pulse signals at the frequency generated by a measurement transducer. The data signals are processed, then temporarily accumulated in a buffer memory effectively compressing the data signals which are thereafter sequenced through a decoder into the calculator input at the highest rate for reliable keyboard entry into the calculator.

8 Claims, 3 Drawing Figures

PATENTED DEC 4 1973 3,777,126

SHEET 2 OF 3

MEASUREMENT TRANSDUCER CALCULATOR INTERFACE

Figure 1:
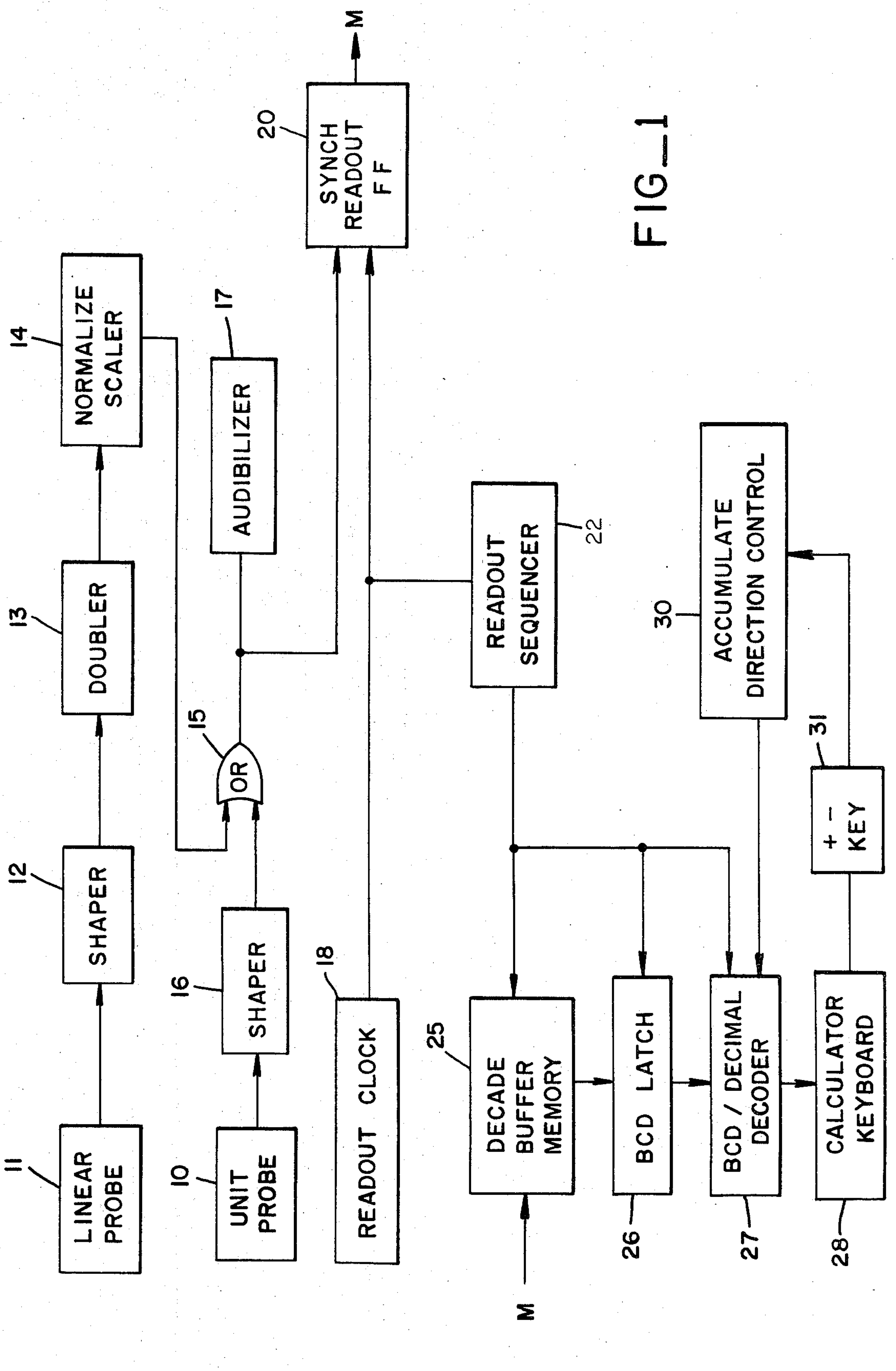

The present application is a continuation-in-part of United States Patent application Ser. No. 815,981, filed on Apr. 14, 1969, entitled ESTIMATING COMPUTER.

The present invention relates to a new and improved transducer/calculator interface for processing output signals from one or more measurement transducers for input to an electronic calculator.

In United States patent application Ser. No. 815,981, there is described an estimating computer for compiling data from blueprints and engineering drawings. Several measurement transducers are provided for gathering a variety of data from blueprints or engineering drawings including a digital probe for counting discrete items and generating corresponding signals, a linear probe for generating a series of signals commensurate with the length of a continuous quantity to be measured, and a planimeter for generating signals in proportion to an area to be measured. The signals generated by the measurement transducers are scaled according to a scale factor setting and a running total accumulated in a work register which also provides a display. Results are transferred to storage banks and the arithmetic portion of an electronic calculator or computer performs arithmetic operations on data retrieved from the data banks or data being entered directly from the measurement transducers. A suitable electronic calculator for use with the measurement transducers in performing these functions is, for example, the Cannon, Inc. model No. 141 and related models as described in *Cannon 141 Electronic Calculator Instructions* published in English in Feb. 1969, I.B.E. 50127 by Cannon, Inc., 9–9 Ginza, 5–C Nome, Chuo-Ku, Tokyo 104, Japan, and as described in the *Cannon Service Manual* also published in 1969 by Cannon, Inc.

Because of the variations in output signals generated by a variety of measurement transducers, it is desirable that the data signals be uniformly processed for input to the electronic calculator. Furthermore, the measurement transducers may generate data signals at a rate in excess of the highest reliable keyboard entry rate for the calculator.

It is, therefore, the object of the present invention to provide a new and improved transducer/calculator interface for uniformly processing the variety of output signals from one or more measurement transducers and for receiving data signals at the rate generated by the measurement transducers, "compressing" the data by temporary storage, and sequencing the uniformly processed data signals into the electronic calculator at the reliable input rate of the calculator.

In order to accomplish these results, the present invention contemplates providing a measurement transducer/calculator interface to be coupled for receiving and shaping pulse signals at the rate generated by one or more measurement transducers. A normalizing scaler adjusts the signals according to a desired scale factor setting and a readout clock synchronizes the processed signals to provide synchronized readout signals.

The invention further contemplates providing a buffer memory for temporarily accumulating the synchronized readout signals, a decoder for decoding signals received from the buffer memory, and means for sequencing or strobing signals from the buffer memory through the decoder into the calculator input at a rate commensurate with the highest reliable rate for calculator keyboard entry. A feature and advantage of this arrangement is that the interface input rate is commensurate with the data signal output rate of the measurement transducers, while the interface output rate is commensurate with the highest reliable input rate for the calculator. The interface achieves this matching by effective "data compression."

According to other aspects of the invention, the readout clock comprises a two-phase clock. The first phase is used for synchronizing the shaped, scaled signals to provide synchronized readout signals for input to the buffer memory. The second phase of the two-phase clock is used for sampling the buffer memory output for sequencing or strobing signals from the buffer memory into the calculator. This technique insures that synchronized data signal input to the buffer memory never occurs at a time when the buffer is being unloaded. A feature and advantage of this arrangement is that signals for readin and readout can never appear simultaneously at the buffer memory thereby avoiding potential race conditions and ambiguous buffer operation. A direction control is also provided over signals sequenced from the buffer memory through a register and decoder to the calculator to determine whether the signals are to be added or subtracted upon entry through the calculator keyboard. The direction control is sampled providing direction commands at a regular rate which is suppressed when the buffer content is zero.

Additional features of the invention include provision for a frequency doubler for doubling the frequency of pulse signals from the measurement transducers to improve scaling resolution, and provision for an audibilizer for providing audible signals corresponding to the scaled signals for the benefit of the operator of the estimating computer or other measurement transducer/calculator system.

Other objects, features and advantages of the present invention will become apparent in the following specification and accompanying drawings.

Figure 2A:
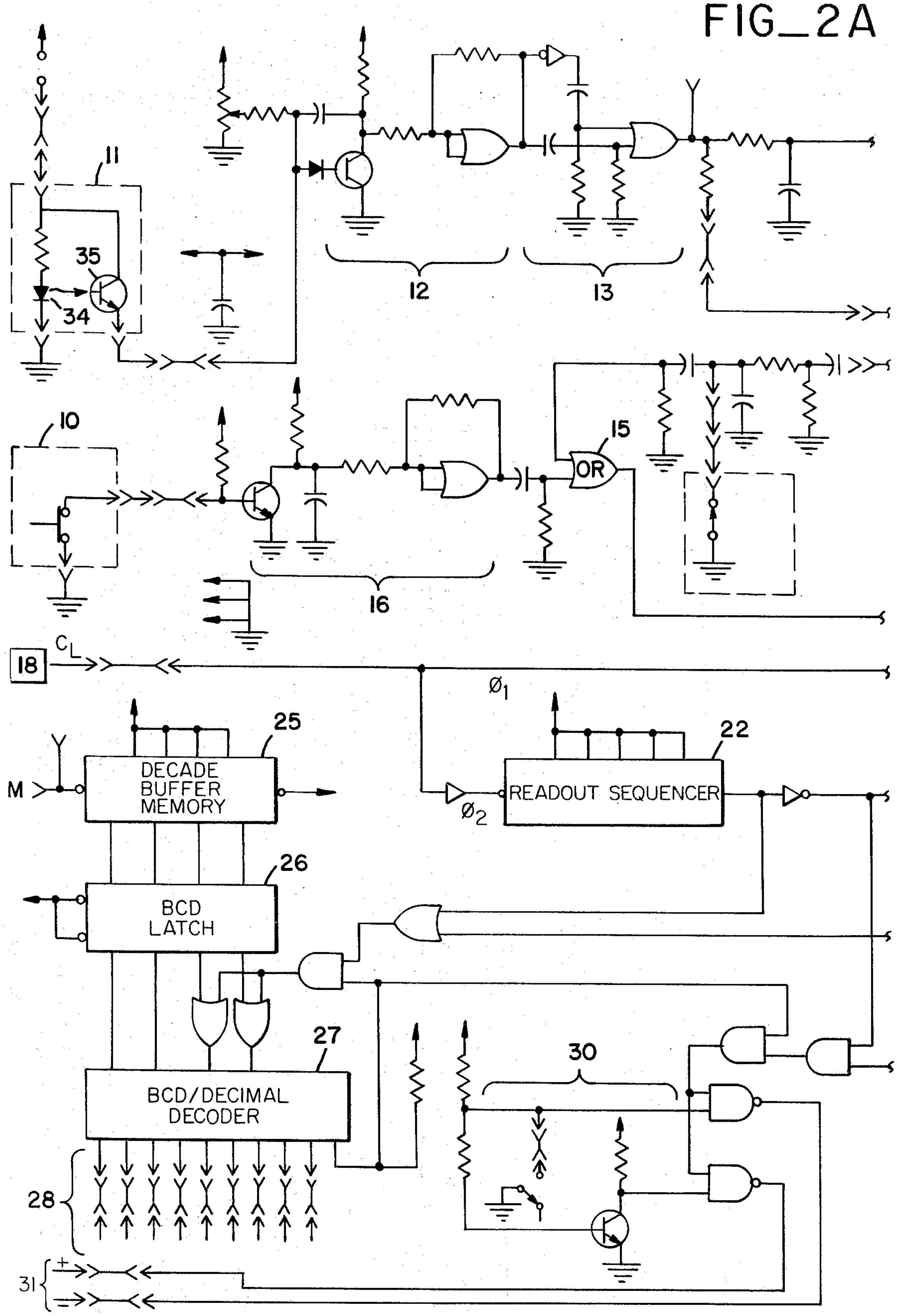
Figure 2B:
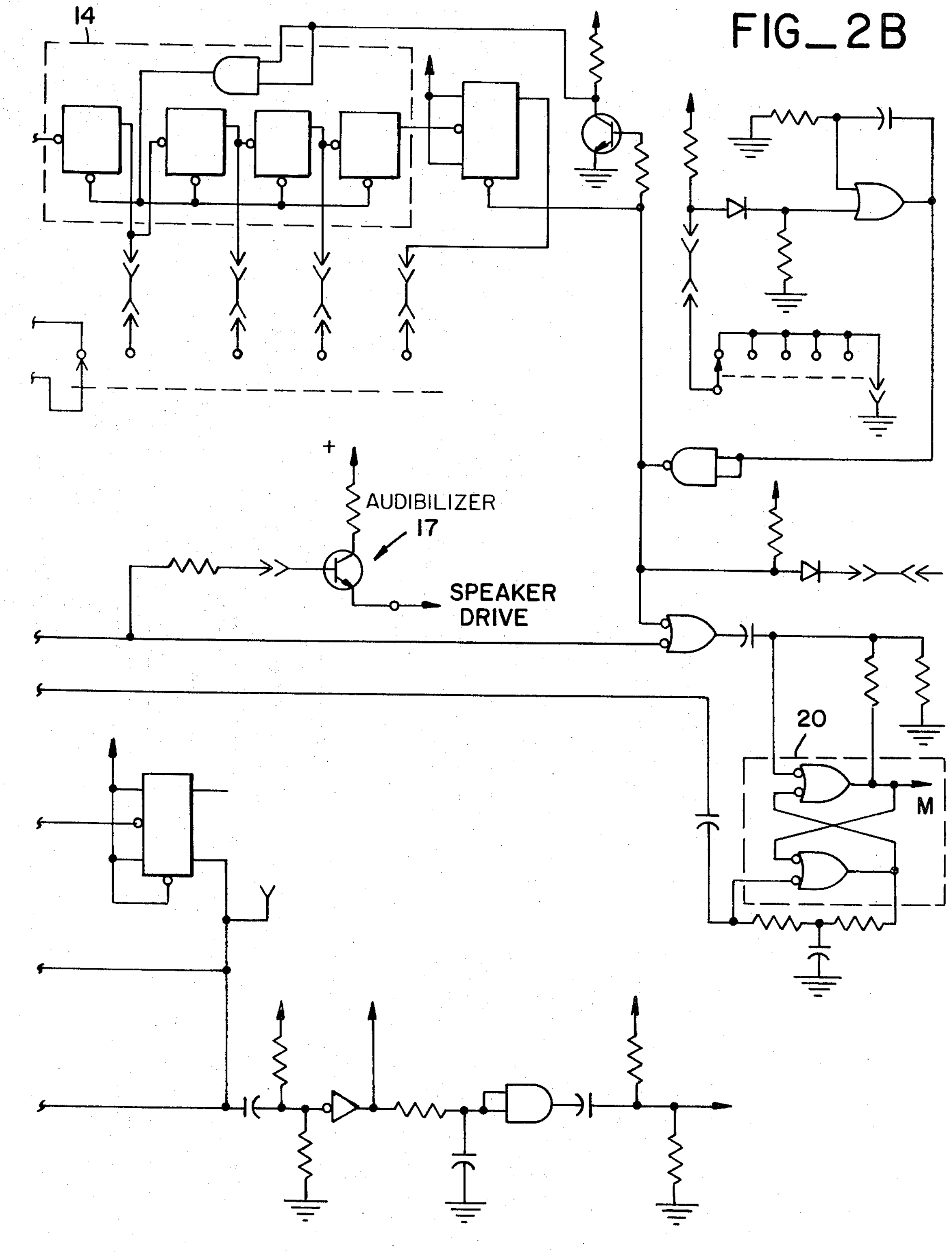

FIG. 1 is a block diagram of the measurement transducer/calculator interface;

FIGS. 2*a* and 2*b* form a detailed, schematic diagram of one example of a measurement transducer/calculator interface when arranged in side-by-side relationship.

In the general block diagram of FIG. 1 and the corresponding specific example of FIGS. 2*a* and 2*b*, inputs to the measurement transducer/calculator interface are provided by a linear probe 11 and unit probe 10 although other measurement transducers such as for example an area planimeter can also be used. The linear probe 11 can be for example a wheel mounted for rotation on a support, of the type described in United States Patent Application Ser. No. 815,981, for measuring continuous quantities. The wheel (not shown) is provided with a circular array of holes formed around the periphery of the wheel and a light source such as light emitting diode 34 positioned on the support directs light through each hole as it passes by the light source position. A transducer such as phototransistor 35 responsive to light passing through the holes generates a series of electronic pulses in number proportional to the distance traversed by the wheel. The unit probe 10 can similarly be of the type described in that application consisting of a digital probe which counts discreet items with each depression of the probe. Input pulses from linear probe 11 which may deliver for example 16 pulses per inch are amplified, conditioned and shaped by a Schmidt shaper circuit 12, doubled by frequency doubler 13, and divided by a scale normalizing binary counter 14. Input pulses are doubled by counting both positive and negative transitions. The doubler 13 provides a twofold improvement in probe resolution for scaling 1/32nd inch to a foot drawings. Taps on the binary divider chain of binary counter 14 permit normalized reading for scales from 1/16th of an inch equals 1 foot, to 1 inch equals 1 foot. The linear probe output pulses of selected scale from normalize scaler 14 are applied to "or" gate 15 along with the conditioned output pulses from unit probe 10 which pass through Schmidt shaper circuit 16. The output of "or" gate 15 drives an audibilizer 17 which provides aural feed-back to the operator and at the same time is synchronized to one phase of a two phase readout clock 18 by means of synchronizing readout flip-flop 20 to provide the synchronized readout signal M. The synchronizing flip-flop 20 insures that there is one output pulse of signal M during phase one of the two phase signal provided by signal output clock 18 for every pulse received from a measurement transducer.

The synchronized readout signal M is accumulated in decade buffer memory 25 while a continuous sampling signal from readout sequencer 22 strobes or samples the contents of the decade buffer memory sequencing the contents into a latch 26 of lesser bit capacity clearing the decade buffer memory 25. Interaction between the synchronized readout signal M and the sampling signal of readout sequencer 22 is avoided by using the second phase or phase two of the readout clock signal from readout clock 18 for sampling by means of the readout sequencer 22. The two signals thus can never appear simultaneously at the buffer memory thereby avoiding a race condition and ambiguous buffer operation. Signals sequenced from the buffer memory 25 and latch 26 pass through a BCD to decimal decoder 27 which provides one for one actuation of the calculator numeric keys of keyboard 28. Entry of a numeral from 1 through 9 by the BCD/decimal decoder 27 is followed up with an add or subtract command from add and subtract keys 31 under control of the accumulate direction control 30, in turn controlled by the probe direction switch. The zero position of the decoder is not used for key actuation of the calculator keyboard. When the decade buffer memory content is zero it is necessary to suppress the add commands or subtract commands since the calculator display will flicker at the rate of the add command or subtract command if it is not inhibited. Thus, whenever the decade buffer memory content is zero it generates a zero inhibit signal to curb the otherwise continuous digit add or subtract key interrogation by the readout sequencer 22.

Thus, regardless of the content of the decade buffer memory 25 the buffer is read out at a fixed rate which readout rate is set at the highest reliable entry rate of calculator keyboard 28. The problem of any race conditions between pulses of the synchronized readout signal M coming into the memory 25 and the readout commands are resolved by using the two-phase clocking technique described above. Pulses from the linear probe 11 or other measurement transducer which cannot be entered pulse by pulse to the calculator keyboard at the frequency generated by the probe or other measurement transducer are therefore compressed and encoded prior to entry by storing the incoming pulses after processing in the temporary buffer and entering the data into the calculator in a decimal digit format of 1 to 9.

I claim:

1. A measurement transducer/calculator interface for processing output signals from one or more measurement transducers for input to an electronic calculator comprising:

means for receiving and shaping data signals at the rate generated by a measurement transducer;
means for scaling said signals;
two phase readout clock means;
means for synchronizing the processed data signals with the first phase of said readout clock to provide synchronized readout signals;
buffer memory means for temporarily accumulating said synchronized readout signals;
decoder means for decoding signals received from the buffer memory;
and means for sequencing data signals from the buffer memory in synchronization with the second phase of the readout clock means and through the decoder into a calculator input at a rate commensurate with the input entry rate of the calculator.

2. A measurement transducer/calculator interface as set forth in claim 1, wherein is provided means for doubling the frequency of the shaped pulse signals for input into the scaling means for improving scaling resolution.

3. A meausrement transducer/calculator interface as set forth in claim 1, wherein is provided direction control means for determining addition or subtraction of signals sequenced from the buffer memory into the calculator.

4. A measurement transducer/calculator interface as set forth in claim 1, wherein is also provided coupled to the output of said scaling means an audibilizer for providing audible signals corresponding to said scaled signals.

5. A measurement transducer/calculator interface for processing output signals from one or more measurement transducers for input to an electronic calculator where at least one of the measurement transducers generates data signals at a rate faster than the highest reliable keyboard entry rate of the calculator comprising:

means for receiving and shaping data signals from a measurement transducer at the rate generated by the measurement transducer;
means for doubling the frequency of said received data signals;
means for adjusting said data signals to a selected scale factor setting;
two-phase readout clock means for generating a clock signal having first and second phases;
means for synchronizing the processed data signals with the first phase of the clock signal to provide synchronized readout signals;
buffer memory means for temporarily accumulating said synchronized readout signals;
decoder means for decoding signals received from the buffer memory;
means for sampling and sequencing data signals from the buffer memory through the decoder into a calculator input at a rate commensurate with the input speed of the calculator, said sampling of the buffer memory synchronized with the second phase of said clock signal whereby data signal input to the buffer memory never occurs at a time when the buffer is being sampled and unloaded;

and direction control means for determining addition or subtraction of signals sequenced from the buffer memory into the calculator.

6. A measurement transducer/calculator interface as set forth in claim 5 wherein is provided an audibilizer for providing audible signals corresponding to the scaled data signals.

7. A method for interfacing output data signals from one or more measurement transducers for input to an electronic calculator comprising:

receiving and shaping data signals from a measurement transducer at the rate generated by the measurement transducer;

scaling said data signals;

generating a two-phase readout clock signal having first and second phases;

synchronizing the processed data signals with the first phase of such readout clock signal to provide synchronized readout data signals;

temporarily accumulating the synchronized readout data signals in a buffer memory;

sampling and sequencing the data signals from the buffer memory into a calculator input at a rate commensurate with the input entry rate of the calculator;

synchronizing said sampling and sequencing of the data signals from the buffer memory with the second phase of the readout clock signal whereby data signal input to the buffer memory never occurs at a time when the buffer is being unloaded;

decoding data signal sequenced from the buffer memory prior to entry at the calculator input;

and determining the direction of transition controlled by data signals entered at the calculator input for addition or subtraction.

8. A method as set forth in claim 7 wherein is provided the step of doubling the frequency of data signals prior to scaling.

* * * * *